(12) United States Patent
Germain et al.

(10) Patent No.: US 8,175,103 B2
(45) Date of Patent: May 8, 2012

(54) DYNAMIC NETWORKING OF VIRTUAL MACHINES

(75) Inventors: Bruno Germain, Laval (CA); Denis Fluet, Longueuil (CA); Ian Harris, Lanarkshire (GB)

(73) Assignee: Rockstar Bidco, LP, New York, NY (US)

( * ) Notice: Subject to any disclaimer, the term of this patent is extended or adjusted under 35 U.S.C. 154(b) by 384 days.

(21) Appl. No.: 12/492,887

(22) Filed: Jun. 26, 2009

(65) Prior Publication Data

US 2009/0323706 A1     Dec. 31, 2009

Related U.S. Application Data

(60) Provisional application No. 61/075,880, filed on Jun. 26, 2008.

(51) Int. Cl.
  *H04L 12/28* (2006.01)
  *H04L 12/56* (2006.01)
(52) U.S. Cl. ........ 370/401; 370/400; 370/235; 370/236; 370/395
(58) Field of Classification Search ................... 370/400, 370/401, 235, 236, 395
See application file for complete search history.

(56) References Cited

U.S. PATENT DOCUMENTS

| 7,688,756 B2 * | 3/2010 | Allan et al. ................... 370/254 |
| 2008/0144644 A1 * | 6/2008 | Allan et al. ................... 370/401 |
| 2009/0041023 A1 * | 2/2009 | Ould Brahim et al. .... 370/395.3 |
| 2009/0279536 A1 * | 11/2009 | Unbehagen et al. .......... 370/352 |

* cited by examiner

*Primary Examiner* — Phirin Sam
*Assistant Examiner* — Blanche Wong
(74) *Attorney, Agent, or Firm* — Saul Ewing LLP (57) ABSTRACT

The invention is directed to the use of Provider Backbone Bridging (PBB) technology with Shortest Path Bridging, also called Provider Link State Bridging (PLSB) technology in the context of data centers and virtualized physical servers infrastructures. Virtual servers can be located anywhere inside the data center, or across different data centers, and still act as though they are physically adjacent and share the same Ethernet connectivity. Ethernet virtual machine VLan memberships are mapped to PBB Service Identifiers (I-SIDs). PBB I-SIDs extend the connectivity model to every Ethernet switches in the local, metropolitan or wide area networks. PLSB complements the connectivity by providing dynamic distribution and mapping of I-SID endpoints in the PBB domain. Virtual servers can then be added, removed or transferred to another point in the network and PLSB adjusts the VLan/I-SID specific connectivity pattern to match the physical distribution of the servers.

19 Claims, 7 Drawing Sheets

DYNAMIC NETWORKING OF VIRTUAL MACHINES

CROSS-REFERENCE TO RELATED APPLICATIONS

This application is based on and claims priority to U.S. Provisional Application No. 61/075,880, filed Jun. 26, 2008, the entire contents of which are fully incorporated herein by reference.

FIELD OF THE INVENTION

The present application relates generally to Ethernet connectivity and, more specifically, to PBB managed Ethernet virtual machines.

BACKGROUND OF THE INVENTION

The concept of data centers is well-known, and there are tens of thousands of data centers scattered around the world. Data centers are facilities that house computer systems and the equipment needed to run them (e.g., storage equipment, communications equipment, power supplies, routers, switches, etc.). Data centers provide a secure facility for protecting and maintaining crucial corporate resources residing on networks. To assure business continuity (e.g., in the case of a catastrophic event occurring at a particular data center), it is commonplace for an entity relying on these crucial resources to have one or more levels of redundancy by "mirroring" their resources in one or more geographically separate data centers.

Typically, data centers house hundreds or thousands of servers, accessible to each other and to outside users via networking technologies such as Ethernet. Over the years, a concept known as server virtualization has been developed. When virtualizing servers, a single physical server is divided into multiple isolated environments, or multiple servers, using a software application. As an example, in a single data center, there may be two thousand physical servers, each having twenty virtual servers, resulting in a total of 40,000 virtual servers existing in the data center; therefore, 40,000 logical devices could be connected to this network housed in this data center.

In theory, virtual servers can reside on any physical server and can be moved around from one physical server to another. This virtual-machine migration process is supported by all virtualization technologies and it allows a virtual machine to be identified and moved to a new location. This is typically done in the event that the virtual machine is busy or is on a server that is busy; it can be moved to a server that is less busy, rather than installing new hardware which would be costly.

In a network or data center situation, however, for practical reasons due to limitations imposed by typical Ethernet architecture, the location of the virtual devices are geographically bound. In actual use, Ethernets are limited in use to smaller Ethernet sub-networks called VLan's, e.g., within the confines of one rack or two adjacent racks of equipment in the data center. One reason for this is that Ethernet, in order for it to be resilient, i.e., self-healing, relies on the Spanning Tree Protocol (STP). If something (e.g., a network element such as a switch) fails or is shut down in a spanning tree network, the entire network flow essentially stops completely, and no data flows over the particular Ethernet until STP converges and builds a loop-free topology route across the network that presents no further risks, after which time it slowly allows traffic to start flowing again.

The above-described delay can last anywhere from 30 seconds to several minutes. For a mission-critical data center, a delay of this magnitude affecting all servers in the data center is unacceptable, and so the above-mentioned Ethernet sub-networks are employed to isolate such delays to affect only the sub-network. For the same reasons, it is not practical using known systems and methods to extend Ethernet between two or more different data centers. This isolation concept limits the interchangeability of the virtual servers to their own sub-network, i.e., to the one or two racks forming the sub-network.

Attempts have been made to provide a bridge between data centers with a number of transport mechanisms (GRE tunnels, PWE or plain VLan extension) but it has always been for point solutions and managed on an exception basis as the model does not scale. These methods provide a point-to-point bridging path over distance that is seen by the Ethernet as a regular Ethernet segment. Given that they need to be provisioned and maintained one at a time, scaling these numbers quickly becomes unmanageable. Once these approaches have reached their practical or operational limits, data center architects are left with relying on the applications running on the virtual machines to solve the redundancy problem across multiple machines and sites. For example, a database could replicate its information to another data center, but in the event of a failure, a new server would need to be brought up to use the replicated information, instead of having the virtual server itself transfer from one physical machine to the other.

As is well known, network provisioning is the process of preparing and equipping a network so that it can provide services as needed. In typical Ethernet systems, to be able to have the flexibility to move a virtual server from one location to a non-adjacent and/or geographically remote location, every sub-net and server location must be pre-provisioned so that, if needed, the location in the first sub-net can communicate with the location in the second sub-net. As mentioned above, this is extremely complex and requires every node of the network to be pre-provisioned.

SUMMARY OF THE INVENTION

The claimed invention is directed to the use of Provider Backbone Bridging, IEEE 802.1ah, (referred to herein as "PBB") technology with Shortest Path Bridging, IEEE 802.1aq, also called Provider Link State Bridging (referred to herein as "PLSB") technology in the context of data centers and the current initiatives done to virtualize physical servers infrastructures. Using the claimed invention, virtual servers can be located anywhere inside the data center, or across different geographically remote data centers, and still act as though they are physically adjacent and share the same Ethernet connectivity.

The claimed invention can be achieved by mapping Ethernet virtual machine VLan memberships to PBB Service Identifiers (known as I-SIDs). Since VLans are generally very limited in geographical scope to span few adjacent physical switches, PBB I-SIDs provide means to extend the connectivity model to every Ethernet switches in the local, metropolitan or wide area networks.

PLSB complements the connectivity described by providing dynamic distribution and mapping of I-SID endpoints in the PBB domain. Virtual servers can then be added, removed or transferred to another point in the network and PLSB adjusts the VLan/I-SID specific connectivity pattern to match the physical distribution of the servers.

In other aspects of the present invention, an apparatus is provided for carrying out this method.

Other aspects and features of the present invention will become apparent to those of ordinary skill in the art upon review of the following description of specific embodiments of the invention in conjunction with the accompanying figures.

DETAILED DISCLOSURE OF THE EMBODIMENT(S)

PBB was developed for a carrier network, and provides a fully or partially meshed network architecture connecting Provider Edge (PE) nodes between themselves, and can provide a scalable and reliable network architecture for large Ethernet deployments. However, PBB lacks a control plane that insures that the topology is loop-free, which is an Ethernet design requirement. PBB is described in detail in commonly assigned U.S. Published Patent Application 2007/0076719, the content of which is incorporated herein by reference.

PLSB expands static configuration of Ethernet MAC forwarding tables by a control plane, and utilizes direct manipulation of Ethernet forwarding by a link state routing system. An embodiment of the claimed invention utilizes PLSB as a control plane for PBB. This provides, among other things, loop-free topologies, alternate paths in case of failure, and the dynamic distribution of information required to establish services across the PBB network. PLSB is described in detail in commonly assigned U.S. Published Patent Application 2007/0086361, the content of which is incorporated herein by reference.

Figure 1:
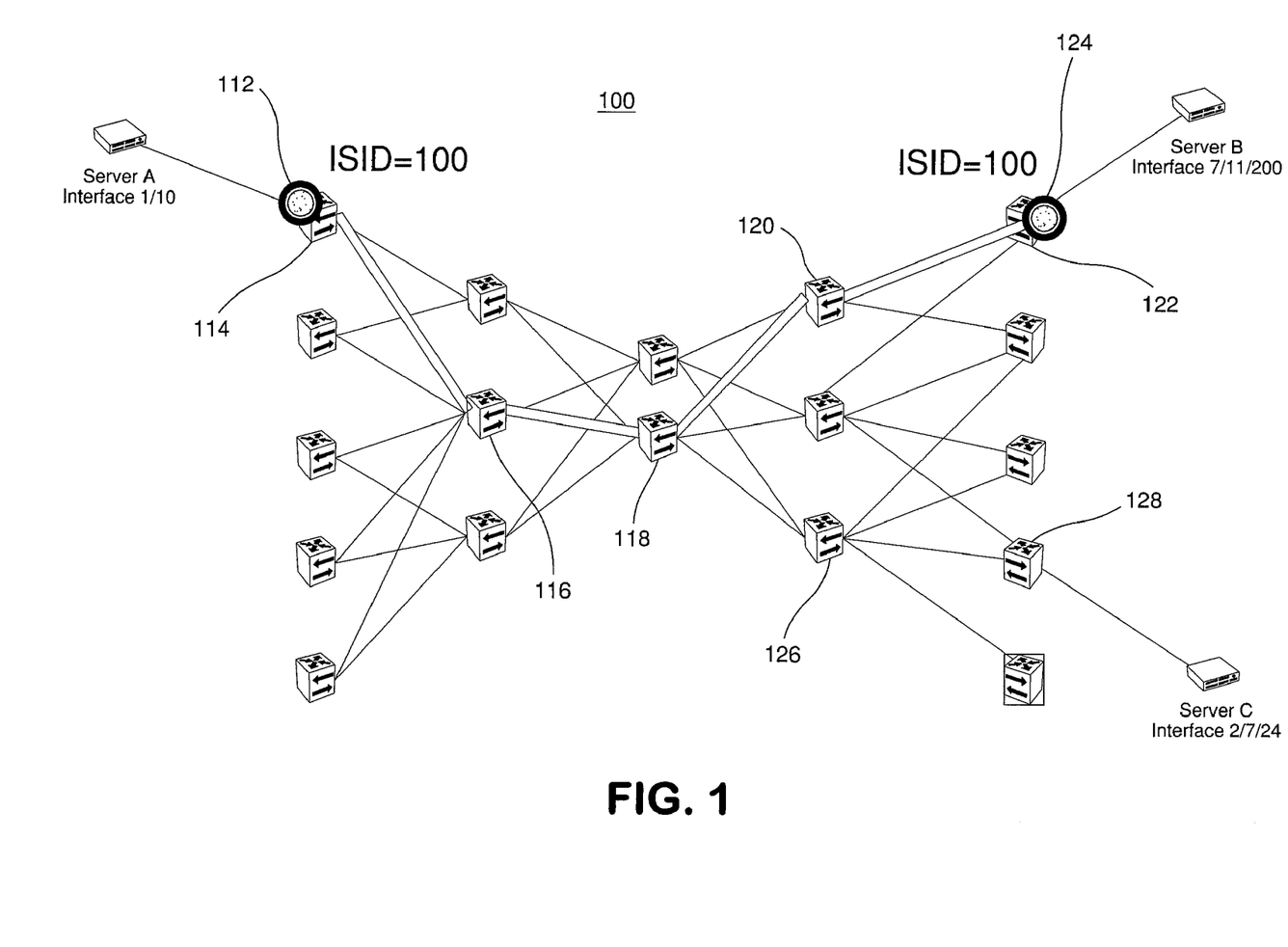
FIG. 1 illustrates an example of provisioning in accordance with the claimed invention.

FIG. 1 illustrates an example of provisioning in accordance with the claimed invention. As illustrated in FIG. 1, a sub-network, comprising edge switches and core switches, each of which are PBB- and PLSB-aware, connects two virtual servers (A and B) by defining them as I-SID 100. Endpoints 112 and 122, defined at edge switches 114 and 124, respectively, represent the point of attachment of servers A and B, respectively, to the sub-network, and thus represent termination points of I-SID 100. The sub-network follows a particular network path traversing PBB- and PLSB-aware switches 114, 116, 118, 120, and 124, the path being identified in FIG. 1 by thicker lines. As is known, the reference to "1/10" identifies port 1 on slot 10; "7/11/200" identifies port 7 on slot 11 on VLan 200; and "2/7/24" identifies port 2 on slot 7 on VLan 24. These designations were selected randomly for purpose of example only, and illustrate that the virtual machines need not be on the same VLan.

Also identified in FIG. 1 is server C, associated with an interface identified as interface 2/7/24. As shown in FIG. 1, at this point, server C is not part of ISID 100.

As can be seen, server C is connected to the PBB network via edge switch 128. In accordance with the claimed invention, edge switch 128 is provisioned into I-SID 100. For example, in one embodiment, CLI commands are applied to edge switch 128, which commands identify it as being associated with ISID 100 and providing the appropriate information to add it to the network pursuant to known PBB technology. For example, the following CLI commands can be utilized:

Config i-sid 100 create
Config i-sid 100 plsb 1 enable
Config i-sid 100 mac-table-size 100
Config i-sid 100 state enable
Config i-sid 100 end-point port 2/7 create
Config i-sid 100 end-point port 2/7 ingress-policer disable
Config i-sid 100 end-point port 2/7 add-c-vlan 24
Config i-sid 100 end-point port 2/7 state enable These commands create I-SID 100 on the node, enable it, attach port 7/2 to I-SID 100, and tell it to accept the traffic coming from VLan 24.

Figure 2:
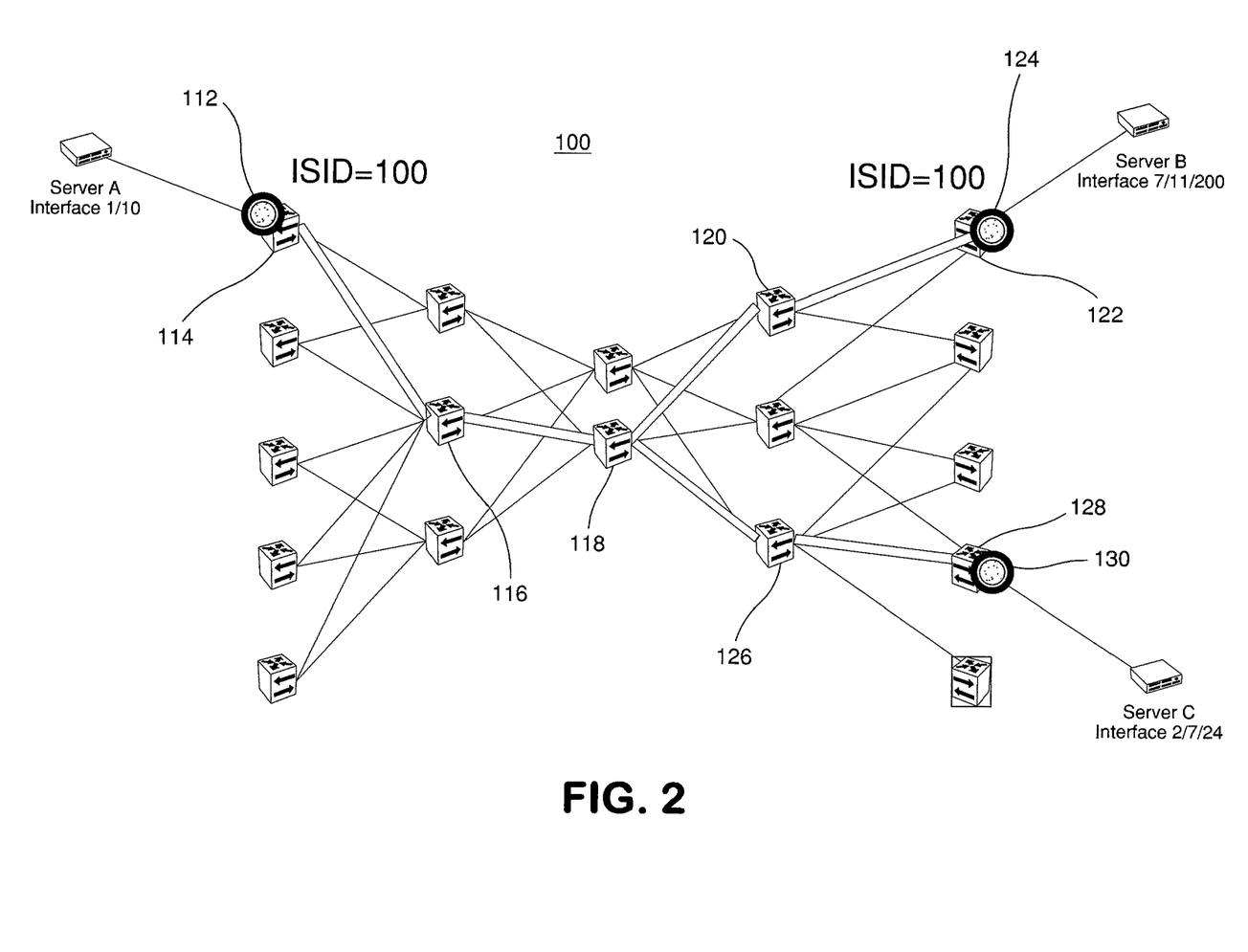
FIG. 2 illustrates the path established from the "old" I-SID 100 sub-network to server C.

Once these commands are applied to edge switch 128, PLSB propagates the fact that there is a new Provider Edge (PE) participating in I-SID 100, and each node already part of I-SID 100 computes the shortest path to reach edge switch 128, and thus server C, to I-SID 100, via switch 126. PLSB propagates this change throughout the network automatically and insures this new end point participates in the specific ISID network. This establishes a path from the "old" I-SID 100 sub-network to server C as shown in FIG. 2.

Thus, using (in this embodiment) simple CLI commands, the sub-network I-SID 100 has been expanded to include server C, which need not be adjacent to server A or server B and, indeed, need not be in the same data center as server A or server B.

FIGS. 3-7 illustrate an example of the migration of a virtual machine from an original access point to a target access point in accordance with the claimed invention. In this example the new access point is located in a different data center than the target access point; however, it is understood that essentially the same process can be followed for migration of a virtual machine from an original access point to a target access point within the same data center.

Figure 3:
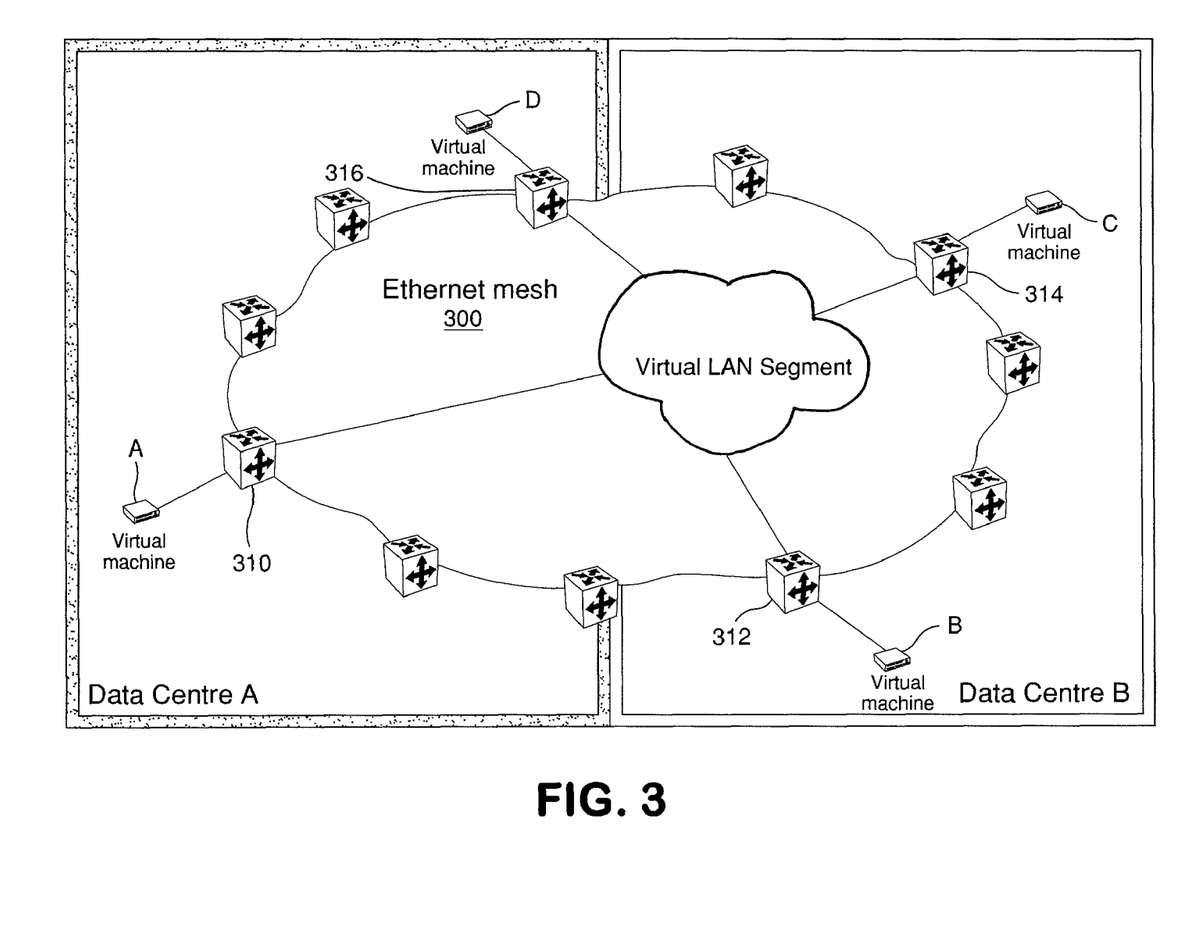
FIGS. 3-7 illustrate an example of the migration of a virtual machine from an original access point to a target access point in accordance with the claimed invention.

Referring to FIG. 3, an Ethernet mesh network 300 is illustrated, showing a virtual LAN comprising virtual machines A, B, C and D, coupled to edge switches 310, 312, 314, and 316, respectively. In a known manner, these edge switches cooperate as a virtual LAN, with virtual machines A and D (and their respective associates edge switches 310 and 316) being located in Data Center A, and virtual machines B and C (and their respective associated edge switches 312 and 314) being located in Data Center B. The virtual LAN in this example is a sub-network whose topology has already been defined using the claimed combination of PBB and PLSB described above.

Figure 4:
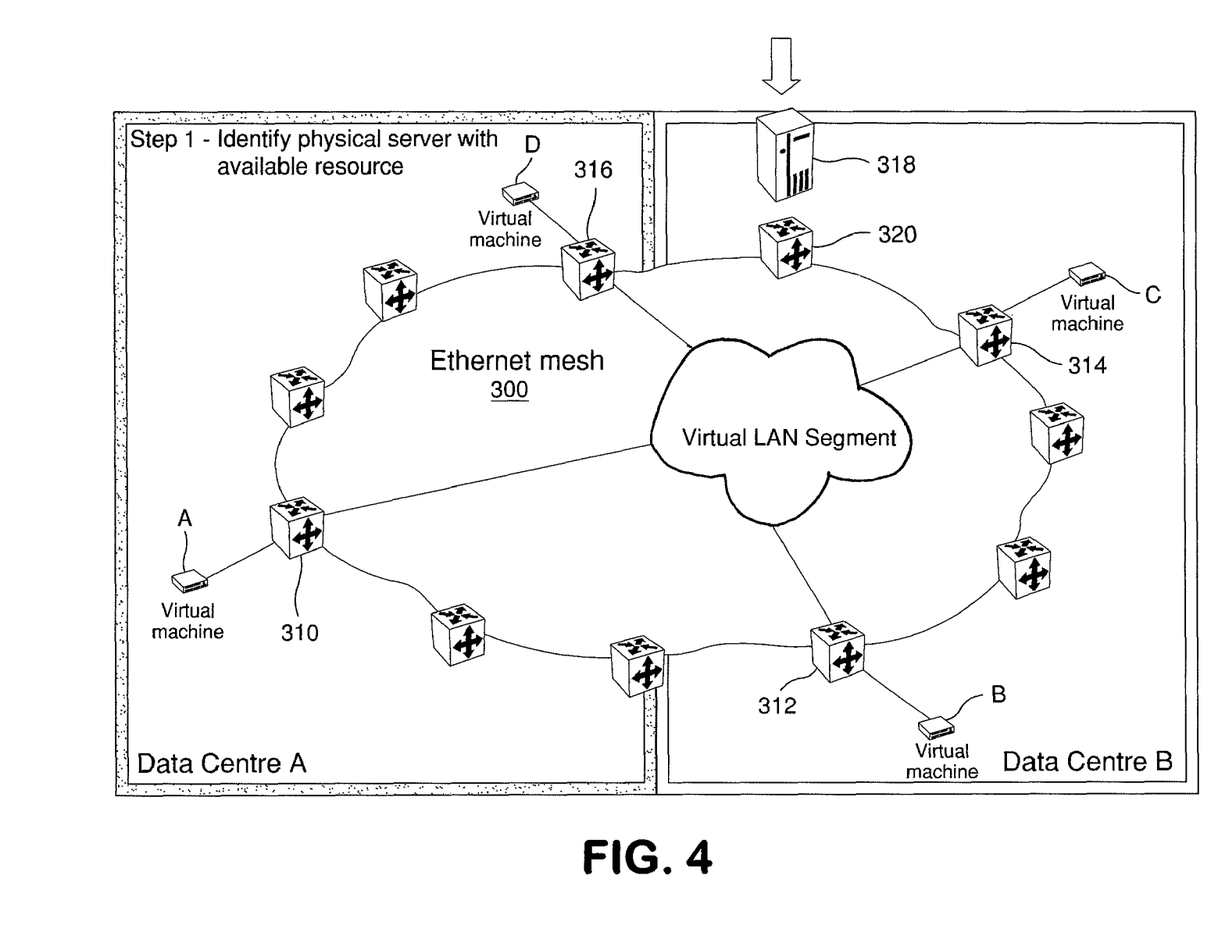

In this example, it is assumed that it is desired to migrate virtual machine A to a new location within the Ethernet mesh 300. Numerous reasons would militate such a migration, for example, server maintenance may be needed, or there may be a power shutdown affecting virtual machine A's current connection to the VLan, etc. As shown in FIG. 4, a physical server 318, associated with edge switch 320, is identified as having the resources available to handle the needs of virtual machine A.

Figure 5:
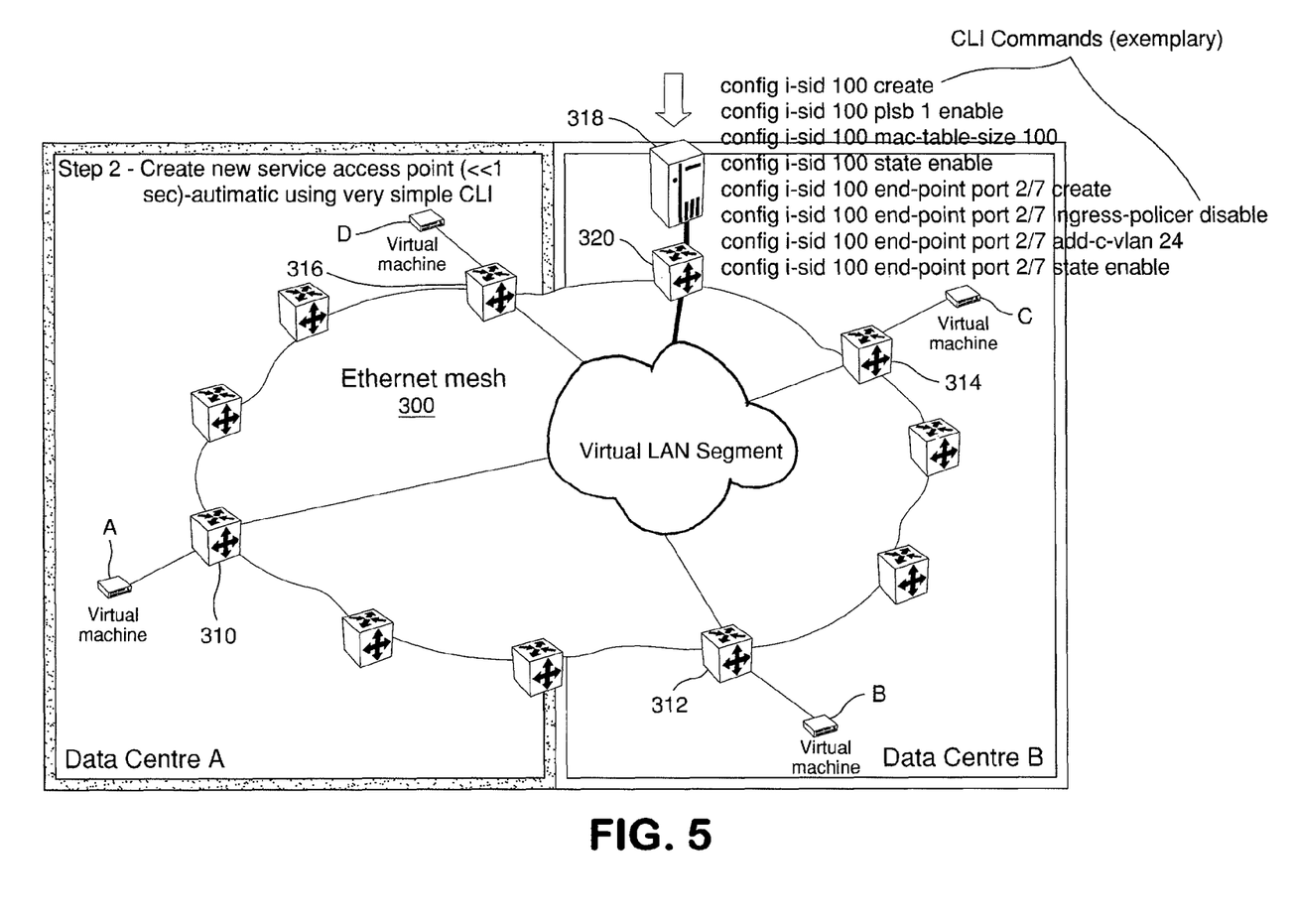
Figure 6:
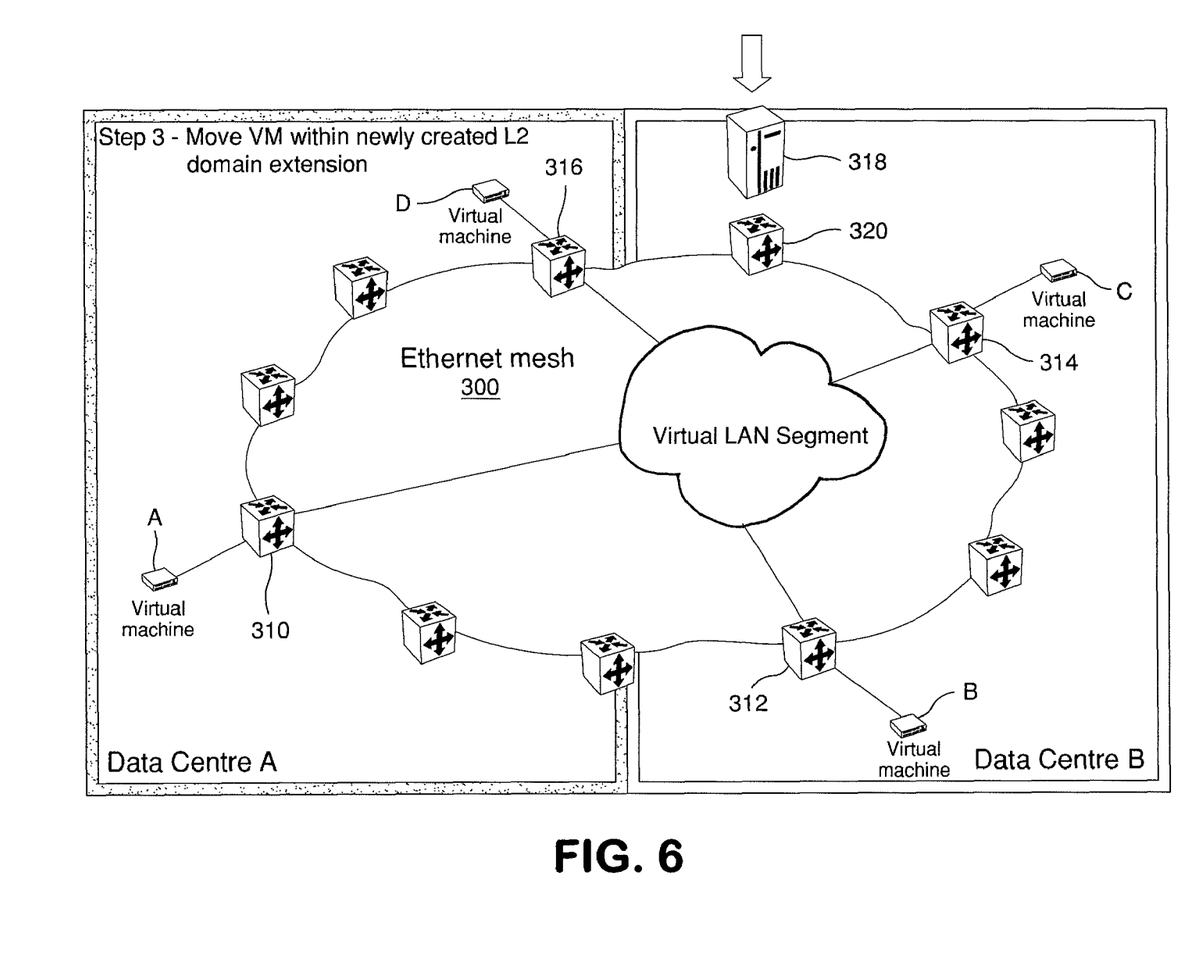
Figure 7:
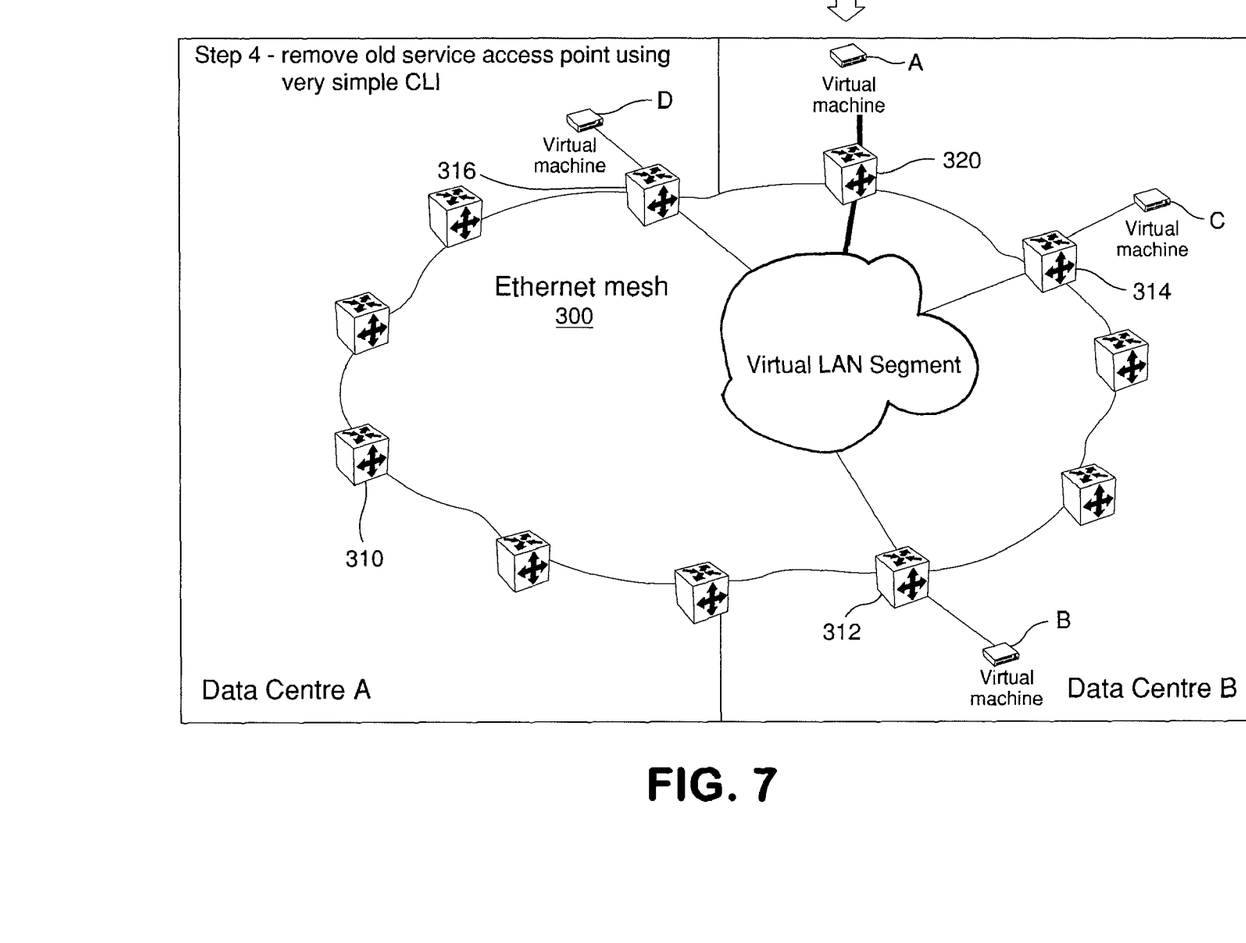

In FIG. 5, a new service access point is created at edge switch 320 by provisioning switch 320 so that server 318 appears on the same I-SID, and thus the same sub-net, as the other servers. In this example, this is accomplished by inputting a series of simple CLI commands (e.g., the same CLI commands described above are used) via physical server 318. This creates an endpoint at edge switch 320 and its attachment to I-SID 100, and sets it as the new access point for virtual machine A. In FIG. 6, virtual machine A is moved to physical server 318, for example, using a known utility in the virtual server environment that transfers virtual machine A to server 318. Finally, as shown in FIG. 7, virtual machine A is disassociated with edge switch 310, again, for example, through the use of simple CLI commands. The original attachment point can now be removed. PLSB once again insures the ISID specific network reflects the change. As shown, virtual machine 302 is now associated with edge switch 320, and the virtual LAN now excludes edge switch 310 and included edge switch 320.

The present claimed invention utilizes PBB, not in a carrier network, but in a local area network (LAN) context to provide virtual networks to virtual servers connected to them, and in conjunction with PLSB, to enable "on-the-fly" provisioning of the LAN and thereby enable adjustments in traffic flow as needed and as desired. The claimed invention merges a WAN carrier technology (PBB) with a control plane technology (PLSB), in a LAN environment. Attributes of this merger of technologies are leveraged to provide network virtualization, i.e., to disassociate an address representing a device or virtual device from its physical location.

An embodiment of the invention accomplishes this using a PBB frame structure that provides an Ethernet addressing hierarchy between edge addresses and core addresses. PBB I-SIDs allow the creation of millions of unique virtual networks inside a common PBB core, and PLSB maintains and propagates link state information for the core network and for each I-SID specific virtual network. The combination of these attributes, when applied in the context of large scale virtual server deployments enables the dynamic assignment of virtual servers and the corresponding traffic pattern to link them within a data center or between data centers. Thus, this aspect of PBB enables the flexible assignment and reassignment of traffic patterns within a data center or between data centers.

To solve a problem caused by the use of STP, that is, the long delays and network stoppages that result when any part of the sub-network is shut down (either for problems or to reallocate resources), in accordance with the claimed invention, PLSB is used to create loop-free/shortest paths topology between the Ethernet endpoints. Rather than blocking all traffic when a link is broken, as occurs with STP Ethernets, using PLSB, traffic continues to flow while it performs its self-healing process, that is, rather than taking minutes to shut down and self-heal as occurs with STP, the repair is performed in milliseconds and thus delays are minimized and, in many instances, go entirely unnoticed.

The advantages of the present invention are many. An Ethernet VLan can be built using endpoints in any accessible location, and it is very scalable, so it can support the very largest data centers. Further, because of the ability to migrate as needed, the need to pre-provision the topology of the network is no longer necessary—the network is simply and easily expanded or contracted or shifted as needed.

The entire data center infrastructure becomes a distributed, all active, always-on environment. The network resources are distributed instead of being duplicated and are added or removed as needed. The full benefit of server/machine virtualization is realized because the claimed invention provides network virtualization. This combined use of PBB/PLSB changes accepted networking paradigms, by opening up the Ethernet domain so as to be able to build service-oriented topologies. Further, it supports the centralization of high level IP services, such as load balancing, firewalls, and security policies. Routing infrastructure is simplified, and millisecond convergence is provided in a highly resistant, meshed network.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of dynamically forming a network of virtual machines in a Provider Backbone Bridging (PBB) domain, comprising the steps of:
   provisioning a first edge node of said PBB domain and a second edge node of said PBB domain to a common PBB Service Identifier (I-SID);
   propagating information to the PBB domain that said first and second edge nodes have been created;
   computing the shortest path between said first edge node and said second edge node; and
   propagating the computed shortest path to the PBB domain, thereby establishing a network connection between said first edge node and said second edge node.

2. The method of claim 1, further comprising:
   associating a first virtual machine with said first edge node;
   associating a second virtual machine with said second edge node;
   whereby said first virtual machine and said second virtual machine are connected via said network connection.

3. The method of claim 1, wherein said provisioning step comprises:
   mapping said first edge node to a PBB I-SID, thereby creating a first Provider Edge participating in said PBB I-SID; and
   mapping said second edge node of said PBB domain to said PBB I-SID, thereby creating a second Provider Edge participating in said PBB I-SID.

4. The method as set forth in claim 3, further comprising performing said steps of propagating of information, computing of the shortest path, and propagating the computed shortest path, using Provider Link State Bridging (PLSB).

5. The method of claim 4, wherein said first and second edge nodes comprise PBB- and PLSB-aware switches.

6. The method of claim 5, wherein said PBB domain comprises a plurality of edge nodes and a plurality of core nodes, each of said edge nodes and said core nodes comprising PBB- and PLSB-aware switches.

7. The method of claim 1, wherein said provisioning step is performed using Command Line Interface (CLI) commands.

8. The method of claim 1, wherein said first edge node and said second edge node are located in a common data center.

9. The method of claim 1, wherein said first edge node and said second edge node are located in geographically diverse data centers.

10. A system of dynamically forming a network of virtual machines in a Provider Backbone Bridging (PBB) domain, comprising:
    means for provisioning a first edge node of said PBB domain and a second edge node of said PBB domain to a common PBB Service Identifier (I-SID);
    means for propagating information to the PBB domain that said first and second edge nodes have been created;
    means for computing the shortest path between said first edge node and said second edge node; and
    means for propagating the computed shortest path to the PBB domain, thereby establishing a network connection between said first edge node and said second edge node.

11. The system of claim 10, further comprising:
    a first virtual machine associated with said first edge node;
    a second virtual machine associated with said second edge node;

whereby said first virtual machine and said second virtual machine are connected via said network connection.

12. The system of claim 10, wherein said provisioning means comprises:
   means for mapping said first edge node to a PBB I-SID, thereby creating a first Provider Edge participating in said PBB I-SID; and
   means for mapping said second edge node of said PBB domain to said PBB I-SID, thereby creating a second Provider Edge participating in said PBB I-SID.

13. The system as set forth in claim 12, wherein said means for performing said propagating of information, computing of the shortest path, and propagating the computed shortest path, comprise Provider Link State Bridging (PLSB).

14. The system of claim 13, wherein said first and second edge nodes comprise PBB- and PLSB-aware switches.

15. The system of claim 14, wherein said PBB domain comprises a plurality of edge nodes and a plurality of core nodes, each of said edge nodes and said core nodes comprising PBB- and PLSB-aware switches.

16. The system of claim 10, wherein said provisioning means uses Command Line Interface (CLI) commands.

17. The system of claim 10, wherein said first edge node and said second edge node are located in a common data center.

18. The system of claim 10, wherein said first edge node and said second edge node are located in geographically diverse data centers.

19. A computer program product for dynamically forming a network of virtual machines in a Provider Backbone Bridging (PBB) domain, the computer program product comprising a non-transitory computer-readable storage medium having computer-readable program code embodied in the medium, the computer-readable program code comprising:
   computer-readable program code that provisions a first edge node of said PBB domain and a second edge node of said PBB domain to a common PBB Service Identifier (I-SID);
   computer-readable program code that propagates information to the PBB domain that said first and second edge nodes have been created;
   computer-readable program code that computes the shortest path between said first edge node and said second edge node; and
   computer-readable program code that propagates the computed shortest path to the PBB domain, thereby establishing a network connection between said first edge node and said second edge node.

* * * * *